United States Patent [19]
Lett

[11] 3,891,185
[45] June 24, 1975

[54] BRAKE SHOE HOLD DOWN SPRING TOOL

[76] Inventor: Laurence W. Lett, c/o George Spector, 3615 Woolworth Bldg., 233 Broadway, New York, N.Y. 10007

[22] Filed: June 25, 1973

[21] Appl. No.: 372,990

[52] U.S. Cl. .............. 254/10.5; 29/227; 81/3 R; 81/170
[51] Int. Cl. ................ B66f 11/00; B25b 27/00
[58] Field of Search ........ 81/3 R, 119, 170; 29/227; 254/10.5

[56] References Cited
UNITED STATES PATENTS

| | | | |
|---|---|---|---|
| 397,794 | 2/1889 | Gates | 81/170 X |
| 1,145,597 | 7/1915 | Kopacki | 81/170 |
| 1,930,859 | 10/1933 | Munro | 81/3 R |
| 2,779,087 | 1/1957 | Shahan | 254/10.5 |
| 3,747,895 | 7/1973 | Martin | 29/227 X |
| 3,760,656 | 9/1973 | Veach | 81/3 R |

*Primary Examiner*—Al Lawrence Smith
*Assistant Examiner*—James G. Smith

[57] ABSTRACT

A hand tool for use to remove or replace hold down springs of brake shoes; the tool consisting of a metal straight shank secured at one end in a handle for being confortably held in a workman's hand, and the other end of the shank having a pair of sideward extending, parallel spaced apart spurs.

1 Claim, 5 Drawing Figures

PATENTED JUN 24 1975 3,891,185
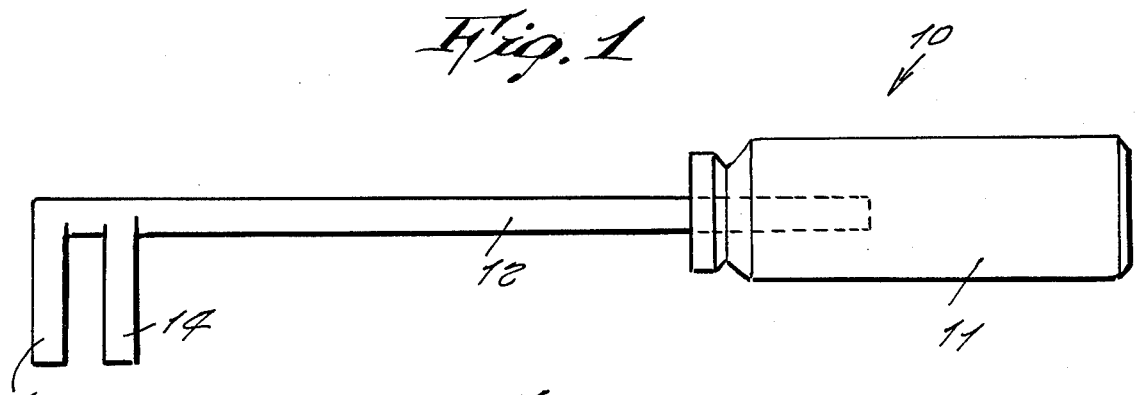
Fig.1
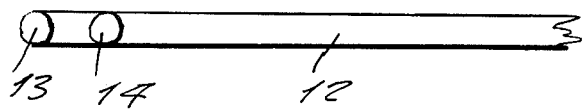
Fig.2
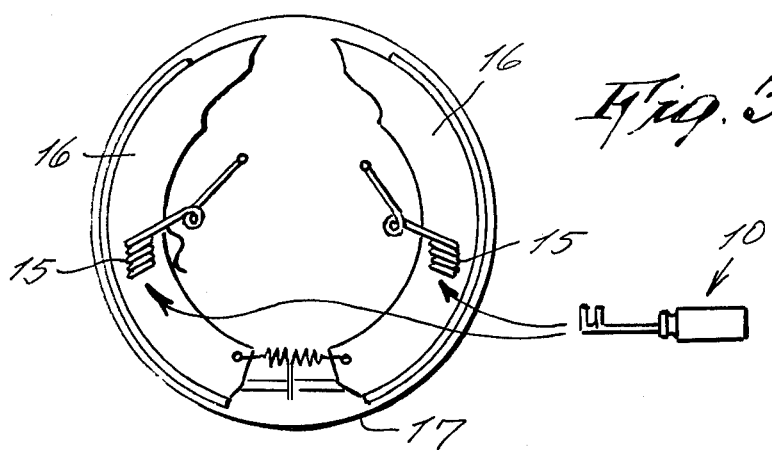
Fig.3
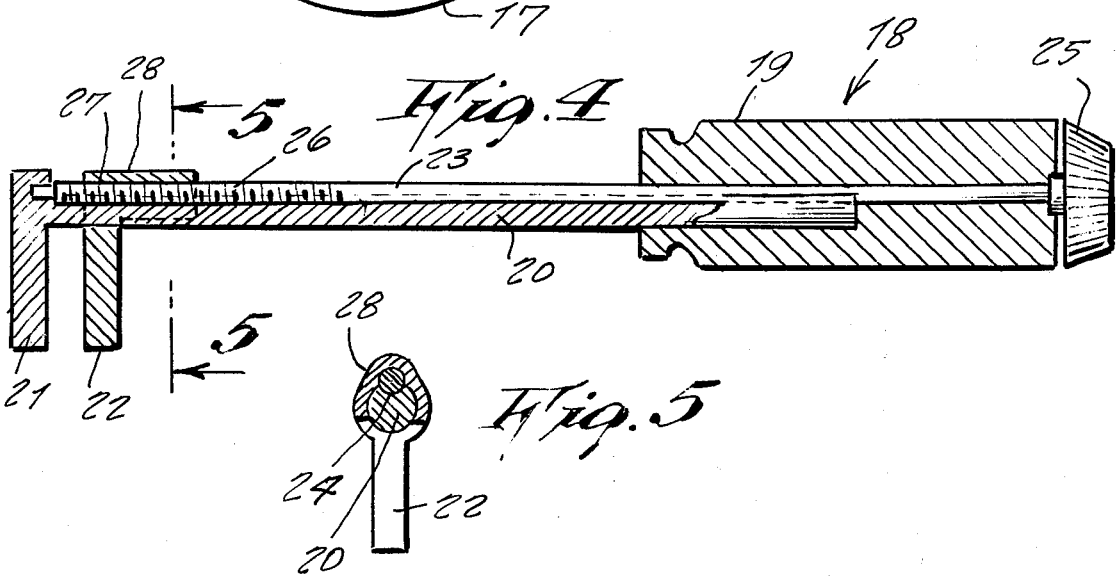
Fig.4
Fig.5

BRAKE SHOE HOLD DOWN SPRING TOOL

This invention relates generally to hand tools. More specifically it relates to brake servicing tools.

A principle object of the present invention is to provide a tool for hold down springs of brake shoes.

Another object is to provide a brake shoe hold down spring tool that is used when removing or replacing such springs; the present tool permitting the task to be performed much more easily.

Another object is to provide a brake shoe hold down spring tool that will work either right or left.

Yet another object is to provide a brake shoe hold down spring tool that will cut the time in half to do this service.

Other objects are to provide a BRAKE SHOE HOLD DOWN SPRING TOOL which is simple in design, inexpensive to manufacture, rugged in construction, easy to use and efficient in operation.

These and other objects will be readily evident upon a study of the following specification and the accompanying drawing wherein:

FIG. 1 is a side view of the present invention.

FIG. 2 is a fragmentary bottom view thereof showing the working end.

FIG. 3 is a side view of the tool in relation to brake shoe hold down springs.

FIG. 4 is a longitudinal cross sectional view of a modified design of the invention.

FIG. 5 is a transverse cross section on line 5—5 of FIG. 4.

Referring now to the drawing in detail, the reference numeral 10 represents a brake shoe hold down spring tool according to the present invention wherein there is shown in FIGS. 1 to 3 a tool assembly that includes a handle 11 attached to one end of a straight metal shank 12. The other end of the shank has a pair of spurs 13 and 14 fixedly secured thereto; the spurs being at right angle to the axis of the shank. The spurs are of metal, are equal in length and are spaced parallel apart.

In operative use, the spurs are utilized to compress the hold down springs 15 of the brake shoes 16 located within the brake drum 17. The spurs 13 and 14 will go in the spring coils from both sides of the spring so to compress the same.

In FIGS. 4 and 5, a modified design of brake shoe hold down spring tool 18 includes a handle 19 fixedly attached on one end of shank 20. The other end of shank 20 is fixedly secured to spur 21. In this form of the invention, a second spur 22 is slidable so to get closer or further away from spur 21, thus making this tool adjustable for different sizes. This is accomplished by a rotatable threaded rod 23 being supported in a longitudinal notch 24 of the shank 20; the rod being rotatable by a knob 25 at the outer end of the handle 19. The rod has a screw thread 26 that engages a screw thread 27 along a base 28 of the spur 22, so that when knob is turned, the spur 22 travels along the shank 20 further or closer to the stationary spur 21. The rod along the notch 24 gives a design that prevents the spur 22 to rotate when knob 25 is turned.

While various changes may be made in the detail construction, it is understood that such changes will be within the spirit and scope of the present invention, as is defined by the appended claims.

I claim as follows:

1. A brake shoe spring tool, comprising a cylindrical shank having a handle mounted encompassingly on one end of said shank and a fixed spur mounted at right angles to the opposite end of said shank, in combination with a rod mounted rotatably through the axis of said handle and having knob affixed to said rod externally of said handle, wherein the shank includes an eccentric slot extending from the first said end to the spur, said rod being rotatably mounted partially in said slot and projecting externally from said slot beyond the shank perimeter engaging rotatably said handle thereby keying the handle to the shank preventing relative rotation between said handle and said shank, said rod having a threaded end adjacent the said spur, in further combination with a longitudinally movable spur having a curved inner surface encompassing a longitudinal bore, said spur being mounted encompassingly on the shank and threaded end of said rod, a portion of said curved inner surface having threads coacting with the threaded end of said rod and the remainder of the curved inner surface slidingly engaging said shank, whereby rotation of said rod will cause the movable spur to move slidably longitudinally over the shank to vary the spacing from the fixed spur.

* * * * *